(12) United States Patent
Bhagavandas et al.

(10) Patent No.: US 10,762,051 B1
(45) Date of Patent: Sep. 1, 2020

(54) REDUCING HASH COLLISIONS IN LARGE SCALE DATA DEDUPLICATION

(71) Applicant: Amazon Technologies, Inc., Seattle, WA (US)

(72) Inventors: Ravishankar Bhagavandas, Redmond, WA (US); Aaron B. Fernandes, Redmond, WA (US); Zehua Wang, Seattle, WA (US); Jiabin Li, Bellevue, WA (US); Huihui Li, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 188 days.

(21) Appl. No.: 16/048,710

(22) Filed: Jul. 30, 2018

(51) Int. Cl.
| | |
|---|---|
| *G06F 7/00* | (2006.01) |
| *G06F 16/174* | (2019.01) |
| *G06F 16/11* | (2019.01) |
| *G06F 16/13* | (2019.01) |

(52) U.S. Cl.
CPC ........ *G06F 16/1752* (2019.01); *G06F 16/113* (2019.01); *G06F 16/128* (2019.01); *G06F 16/137* (2019.01)

(58) Field of Classification Search
CPC .. G06F 16/1752; G06F 16/137; G06F 16/113; G06F 16/128

USPC .................................................. 707/600–899
See application file for complete search history.

(56) References Cited

U.S. PATENT DOCUMENTS

| | | | |
|---|---|---|---|
| 9,298,723 B1 * | 3/2016 | Vincent ............... | G06F 16/1748 |
| 10,608,784 B2 * | 3/2020 | Yanovsky ........... | G06F 16/1752 |

* cited by examiner

*Primary Examiner* — Isaac M Woo
(74) *Attorney, Agent, or Firm* — Leel & Hayes, P.C.

(57) ABSTRACT

A system obtains a first data chunk and a second data chunk of a plurality of data chunks associated with a first data snapshot of a computing system. A hash record is assigned to a data chunk, and used to create a hash value that is written to a first lookup table. The hash function is selected from a plurality of hash functions. The system creates a first archive by saving the plurality of data chunks and the first lookup table to a datastore. The system writes a second hash record for the individual data chunks to a second lookup table using the same hash functions that were used for the first lookup table. Dissimilar hash values between the first lookup table and the second lookup table are identified, and a second archive that includes data chunks with different data from the corresponding data chunks from the first data snapshot is created based on the data chunks with the dissimilar hash values.

20 Claims, 12 Drawing Sheets

REDUCING HASH COLLISIONS IN LARGE SCALE DATA DEDUPLICATION

BACKGROUND

Data storage and database management have become ubiquitous among software systems in recent years. In some cases, such systems may manage data of a customer, of an account, of a business, of an application, etc. Additionally, web services may provide database management solutions and/or the ability to access database engines or storage subsystems.

Database managers protect stored data with various techniques including data duplication (or intelligent compression) that makes data comparisons to detect missing or corrupt archives. With conventional archiving methods data storage can be unnecessarily duplicative.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
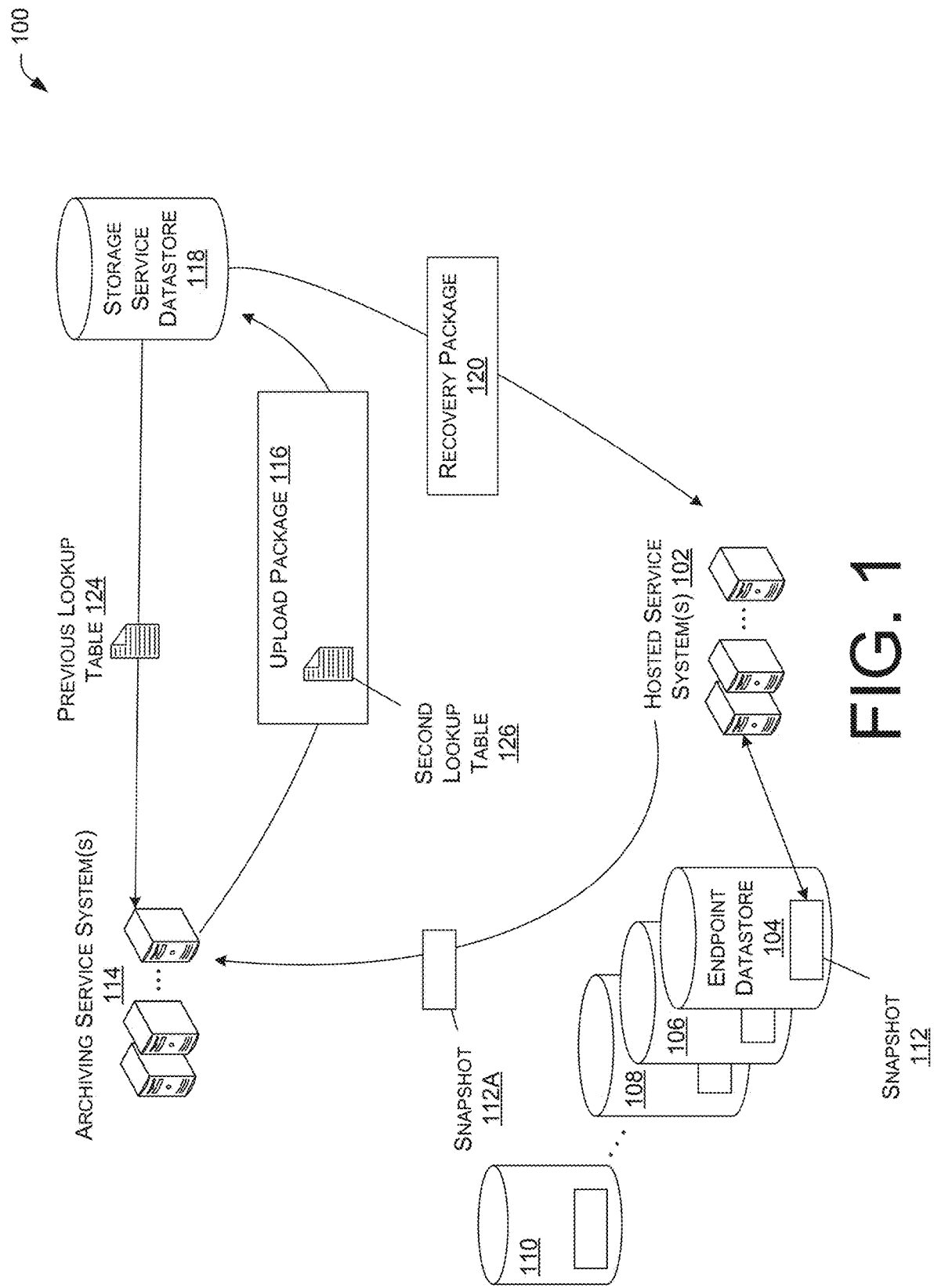
FIG. 1 is a schematic diagram of an illustrative environment that includes services and systems to enable generation of an archive database, according to example embodiments of the disclosure.

As the costs of data storage have declined over the years, and as the ability to interconnect various elements of the computing infrastructure has improved, more and more data pertaining to a wide variety of applications can potentially be collected and analyzed. With proliferation of data comes the need to store the data and ensure that corrupt or lost data be replaced with backed up copies. When managing backup copies, data deduplication techniques compare chunks of data using hash functions. Hash tables (hash maps) are data structures that implement an associative array abstract data type, which is a structure that can map keys to values. A hash table uses a hash function to compute an index into an array of buckets or slots, from which the desired value can be found. Ideally, the hash function will assign each key to a unique bucket, but most hash table designs capable of processing large volumes of data in an efficient manner can employ an imperfect hash function, which might cause hash collisions where the hash function generates the same index for more than one key. Hash collisions occur when two hash values (the output of a hash function) produce the same result given two different inputs. Such collisions, given enough inputs, are not so rare as to be ignored, and must be accommodated in some way.

Every hash function with more inputs than outputs will necessarily have collisions. Consider a hash function such as SHA-256 that produces 256 bits of output from an arbitrarily large input. Since it must generate one of 256 outputs for each member of a much larger set of inputs, the pigeonhole principle guarantees that some inputs will hash to the same output. Collision resistance does not mean that no collisions exist; simply that they are difficult to find. Cryptographic hash functions are usually designed to be collision resistant. However, hash collisions can occur where non-identical copies appear to be identical. This disclosure is directed to one or more computing services, such as a software as a service (SaaS), that provide improved data archive services by reducing hash collisions that could indicate a false match (indicating that the datasets are identical) between two datasets that are not identical. The services, as implemented by the systems, methods, and apparatuses disclosed herein, may improve the quality of data archival services by ensuring a higher level of data continuity and integrity, and making more efficient use of testing infrastructure and resources. Additionally, the mechanisms, as disclosed herein, allow for increased efficiency with respect to data storage resources, since duplicate identical copies of archived data portions are reduced without decreasing the integrity of the data archive.

Today, large scale data management services keep multiple copies of data sets to ensure data integrity for customers of the service. For example, it is not uncommon for many petabytes of data to be backed up in duplicate every several days. In some instances, 8 copies or more of these enormous datasets are maintained at any given time. Each copy is considered to be a "snapshot."

Data deduplication (or intelligent compression) is a technique that eliminates redundant copies of data in data store archives, which thereby reduces storage footprint in large backup services and other storage systems. Among different data deduplication techniques, source deduplication increases the storage efficiency, as well as eliminates the network overhead of transmitting duplicate data and CPU overhead (encryption, compression etc.) of processing redundant data. Hence, deduplication has a huge potential of saving costs in large scale backup/restore services and other storage systems.

Source deduplication breaks the source data into fixed size data chunks (or blocks), creates hash values using a predetermined hash function, and then compares the hash value of each chunk with the hash value of an already stored chunk. If a match is detected (that is, the hash values calculated for the already stored chunk and the hash value of the present chunk are identical) the present chunk is considered a duplicate. Duplicate chunks are replaced in the storage digest by a pointer to the location of the actual chunk.

Several techniques are contemplated that can reduce the chances of hash collision. For example, one way to reduce the chance of two identical hash values generated by non-identical data is by increasing the strength of the cryptographic hash function used to generate the hash value. The particular hash function used in the hash value calculation can have a direct effect on the probability of getting two hash values with the same number from two datasets that are not identical. The probability changes drastically with the additional stored bits inherent with larger hash functions. While a hash function like SHA1 provides a strong guarantee of avoiding hash collisions (that is, there is very little probability of hash collisions), building truly reliable backup services requires near zero data corruption due to hash collisions. For example, instead of an md5 hash function, which outputs a 128 bit hash value, a SHA256 hash function could be utilized that outputs hash values with a larger number of bits. While this diminishes the probability of hash collisions, the overhead of storing additional hash bits per data chunk may outweigh the benefit. Even still, although the probability is reduced, there still exists a possibility of a hash collision with a single hashing algorithm.

In another technique, it may be possible store a set of bytes from a fixed offset in the chunk along with the hash value for comparison. While this technique can provide additional reliability, there could be cases where bytes at the fixed offset always matches for all the chunks being evaluated. For example, two data chunks being evaluated may be identical only in one area, and by coincidence, the identical area is the portion sampled at the offset for both data chunks. While the probability of this occurring may seem astronomically low, mission critical data may not tolerate even a minute risk of data loss.

In a third technique, the chances of hash collision could be further reduced by using the computed hash function to pick bytes in a deterministic random order from the data chunk and store them along with the hash value. In case of a hash match, the same hash value may be used to pick the bytes in the same order and check for a match. This provides an increased degree of reliability by introducing randomness in picking the data.

According to embodiments described herein, a fourth technique is contemplated that introduces random selection of the bit offset, which is driven by a random selection of a hash function. Accordingly, it can be advantageous to provide a bit vector having a number 'n' bits, in addition to a selection of a hash function from a set of hash functions, and store data in the bit vector that can be used to determine a true match between hash values. With this technique, the system can compute a hash value using a randomly picked hash function, and use the hash value to calculate the bit vector having a predetermined length. For example, if a family of hash functions included k different functions, each of the functions in the family of k functions would produce a different, unique bit vector, because the hash value of each hash function would produce a unique bit vector of the stored data chunk.

The technique in the preceding paragraph (the "fourth technique") provides a relatively high degree of reliability against hash collisions, due to the use of a randomly selected hash function from a predetermined group of functions. In addition, the probability of collision can be further reduced as the number of hash functions added to the family of selectable hash functions is increased. Data deduplication algorithms can be used to store and transfers data at scale. This technique can be used in the implementation of source based deduplication services. It gives users a high degree of reliability on the data integrity without performing a byte by byte comparison of the actual data stored in a remote location. Accordingly, a considerable savings is made to computing cost and storage volume. Also, this solution can further increase the reliability of the data archival services with a little space overhead of storing additional bits.

Considering the fourth technique above in greater detail, according to one example embodiment, a system processor in an archiving service system can perform acts to generate an archive database on a datastore. The archive database may store datasets backed up from an address that an application uses to connect with the archiving service systems and the storage service datastores (the address to which referred to herein as an endpoint). The processor of the archiving service system starts by dividing a snapshot of all of the data from an endpoint that is designated to be backed up into chunks of data. As used herein, the body of data that records the state of one or more client computing systems at a particular point in time is referred to herein as a data snapshot. That is to say, the data snapshot is a recorded machine state of a computing system at a particular point in time, embodied as a set of data that can be used to re-create the computing systems (and their state) at a later date.

After copying a data snapshot of the client computing system, the archiving service divides the data snapshot into a plurality of data chunks. According to one embodiment, a chunk size can range from 4 KB to 96 KB of data. Other chunk sizes are contemplated. It should be appreciated that the number of the plurality of data chunks is variable, and that determines the relative size of the data chunks. Smaller chunk size can result in identifying more duplicates (and thus, more conservation of datastore space), but can also result in additional computing costs in terms of deduplication time and larger size of the chunk look up tables. As the data chunks increase in size (e.g., the number of total chunks divided is smaller given a single snapshot), the smaller the possibility that any two data chunks contain the same data. Larger chunk size results in faster duplication and smaller size of the chunk look up tables. However larger chunk sizes come at the cost of less storage savings.

Once the system divides the data snapshot into data chunks, the processor selects from a plurality of hash functions, a respective hash function for each of the plurality of data chunks. Stated in another way, the archiving service randomly picks a hash function for each data chunk from a pot of hash functions. The number of hash functions available for selection is also a variable with performance advantages and disadvantages based on the number of hash functions. For example, more hash functions in the pot bring a higher level of randomness (and thus, greater probability of avoiding hash collisions). But more hash functions come at the cost of computing storage and speed due to the higher number of bits stored for the hash values in larger functions.

In some aspects, the system then writes, for each of the data chunks of the plurality of data chunks, a hash record to a lookup table. To do this, the processor assigns a hash value for each of the data chunks of the plurality of data chunks using the respectively selected hash functions, and a key value based on the set bit values of the bit vector. This lookup table corresponds to the data chunks in a single data snapshot, and contains hash records for each of the data chunks associated with that single snapshot. The hash record contains, among other things, the calculated value of the hash function, and other information that can be used to organize the unpacked data chunks at the datastore and retrieve any archived data chunks during a restore operation. Because the data chunks may not be stored in contiguous memory locations at the datastore, a map is needed to retrieve all of the portions of the snapshot and reassemble them to recreate the machine state at the time of the snapshot. This information is also stored in the hash record, which is permanently associated with each data chunk.

Assuming this process has been completed at least once, where every data chunk is processed and recorded on a corresponding lookup table, the archive system can now, at the next data snapshot, determine which corresponding chunks have changed since the last snapshot and which data chunks remain the same. Data backups (snapshots) may occur periodically (e.g., every 4 days, 10, days, etc.). Accordingly, during a subsequent backup operation, the system downloads the previous lookup table associated with the snapshot at issue, and performs the hash value assignment and calculation steps again for each of the data chunks. A second lookup table is created for the present snapshot, which corresponds directly with the lookup table from the previous snapshot in terms of the number of data chunks and the functions During the next snapshot, the system identifies any dissimilar hash values between the first lookup table and corresponding hash values in a second lookup table. Any dissimilar hash values indicate that there is changed data, and thus, a need to upload that data chunk to the datastore for archiving. The previous archive is not overwritten. Instead, the archive system creates a second archive by saving only the dissimilar data chunks to a datastore. The plurality of dissimilar data chunks are respectively associated with the dissimilar hash values between the first table and the second table.

For illustrative purposes, some embodiments are described below in which specific instances of data storage management are provided in specific ways, including with respect to specific storage environments (e.g., an online data storage service that is accessible to users over one or more networks). These examples are provided for illustrative purposes and are simplified for the sake of brevity, and the inventive techniques can be used in a wide variety of other situations (e.g., as part of one or more storage devices attached to a single computer system), some of which are discussed below, and the techniques are not limited to use with particular types of data, storage or other devices, computing systems or computing system arrangements.

According to example embodiments, FIG. 1 is a schematic diagram of an illustrative environment 100 that includes services and systems including one or more hosted service systems 102, one or more archiving systems 114, and a storage service datastore 118, to enable archiving services, according to example embodiments of the disclosure. In particular, in the illustrated embodiment, an automated archiving service system 114 is shown, and it is providing data storage functionality for an associated storage service datastore 118.

The environment may further include a plurality of endpoint datastores, including, for example, endpoint datastores 104, 106, 108, 110, etc. Although four datastores are shown in FIG. 1 it is appreciated that any number of datastores are contemplated, and thus, are not limited to four. An endpoint, generally, is an address that a hosted application uses to connect with the archiving service systems 114 and the storage service datastore 118.

Various users (not shown) of various user computing systems (e.g., the hosted service systems 102) may interact over one or more networks with the data storage service datastore 118, which is provided by one or more other configured computing systems (not shown). The networks are depicted generally by arrows in FIG. 1, and discussed in greater detail with respect to FIGS. 9, 10, and 12. In particular, the various data storage users use the hosted service systems 102 to provide new data to be stored by the data storage service (e.g., on one or more non-volatile storage devices (not shown) of the storage service 102), and/or to request that one or more existing stored snapshots 112 of data be retrieved and provided to the data storage users. As previously discussed, the snapshot of data that records the state of one or more client computing systems at a particular point in time is referred to herein as a data snapshot. That is to say, the data snapshot is a recorded machine state of a computing system at a particular point in time, embodied as a set of data that can be used to re-create the computing systems (and their state) at a later date. Each of the endpoints of the hosted service systems 102 may include a portion of memory in the endpoint datastore (104, 106, 108, 110) for saving a data snapshot 112. In some computing architectures, there may be many hundreds or thousands of endpoints.

In the illustrated embodiment, the archiving service systems 114 and storage service datastore 118 are integrated into two systems that may be provided by a single entity, (not shown). In other embodiments, the systems may be implemented in other forms (e.g., being separate systems operated by separate entities, being a single system that includes at least some of the described functionality of both the storage management system and the data storage service, etc.).

The service systems 114, 102, and 118 may communicate via any appropriate network or combination of networks, including an intranet, the Internet, one or more private networks with access to and/or from the Internet, a cellular network, a local area network, or any other such network or combination thereof. Communication over the networks may be enabled by wired or wireless connections and combinations thereof. In the illustrated embodiment, the system services (e.g., network service 1004 depicted with respect to FIG. 10) may include software instructions that execute on one or more computing systems (not shown) to program or otherwise configure those computing systems to perform some or all of the described techniques, and the systems that include those modules similarly may include those software instructions and optionally other software instructions. In addition, the modules and systems may be provided in various manners, such as at a single data center or otherwise to use a group of co-located computing systems, or instead in a distributed manner using various computing systems in various distinct geographical locations. Furthermore, the hosted service systems 102, the archiving service systems 114, and the storage service datastore 118 may include multiple physical computing systems and/or multiple virtual machines that are hosted on one or more physical computing systems.

As will be appreciated, although a Web-based environment is used for purposes of explanation, different environments may be used, as appropriate, to implement various embodiments. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server (which may be one or more servers in the archiving service systems 114 hosted service system 102, etc.) for receiving requests and serving content in response thereto, although for other networks an alternative device serving a similar purpose could be used as would be apparent to one of ordinary skill in the art.

The illustrative environment includes at least one hosted service system 102, one or more archiving service systems 114, and a storage service datastore 118. It should be understood that there can be several application servers, layers, or other elements, processes or components, which may be chained or otherwise configured, which can interact to perform tasks such as obtaining data from an appropriate data store. As used herein the terms "datastore" and "data store" refer to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the datastore, and is able to generate content such as text, graphics, audio and/or video to be transferred to the user, which may be served to the user by the Web server in the form of HTML, XML or another appropriate structured language in this example. The handling of all requests and responses, as well as the delivery of content between a client device (not shown) and the hosted service systems 102, can be handled by a Web server (not shown).

The storage service datastore 118 can include several separate data tables, databases or other data storage mechanisms and media for storing data relating to a particular aspect. For example, the data store illustrated includes mechanisms for storing production data and user information, which can be used to serve content such as data snapshots. For example, a data snapshot 112 is shown in FIG. 1, and represents an initial system snapshot of an endpoint datastore 104 with which a comparison will be made. FIG. 1 also depicts a snapshot 112A which represents a second instance of a data snapshot of the endpoint datastore 104, but taken at a later time. The storage service datastore 118 is shown to include a mechanism for storing log data such as a previous lookup table 124, which can be used for reporting, analysis, or other such purposes. The storage service datastore 118 is operable, through logic associated therewith, to receive instructions from the archiving service systems 114 and the hosted service systems 102, and obtain, update or otherwise process data in response thereto.

Each of the archiving service systems 114, storage service datastore 118, and hosted service systems 102 will typically include one or more servers that include an operating system that provides executable program instructions for the general administration and operation of that server and connected data storage, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

According to one example embodiment, the archiving service systems 114 may perform acts to generate an archive database on the storage service datastore 118. The archive database may include multiple copies of a particular endpoint datastore, where each of the multiple copies may represent a state of the endpoint at a particular moment in time. In an analogous example, a photograph could represent the physical state of the object being photographed. Similarly, the snapshot 112 records all aspects of the state of the hosted service and accompanying data stored in its datastore 104 such that the state of the hosted service can be recreated in the event of data loss at the endpoint. The snapshot 112 of endpoint datastore 104 represents a data snapshot at a moment in time, and the snapshot 112A represents a snapshot of the same endpoint datastore 104 taken at a later moment in time. According to an embodiment, the archiving service system 114 will process the snapshot 112 by dividing the snapshot into data chunks, then saving all of the chunks in their entirety to the storage service datastore 118. A lookup table (shown here as the previous lookup table 124) is also written by the system 114 to record information for each of the divided chunks saved to the storage service datastore 118. At a later time, the archiving service systems 114 may obtain (download, bitstream, etc.) the second snapshot 112A, and download a previous lookup table 124 that provides a record of each respective chunk of the endpoint datastore 104 when the previous data snapshot 112 was recorded.

In the exemplary embodiment of FIG. 1, the archiving service system 114 processes the second snapshot 112A (described in greater detail with respect to the following figures) by dividing the snapshot 112A into the same sized chunks as the snapshot 112, evaluating the hash values of each of the chunks by randomly selecting a hash function from a pot of hash functions, using the hash result for each respective chunk to generate a unique bit vector populated with data from the respective data chunk, and comparing that result with the corresponding chunk from the previous snapshot 112. The hash information and other metadata is recorded on a second lookup table 126. Chunk by chunk, the system 114 compares the first snapshot with the second snapshot 112A, and evaluates whether any particular chunk has changed since a prior archiving operation based on the hash value comparison for that chunk. Any chunks that have changed since the last data snapshot 112 are queued in a buffer until a sufficient (predetermined) volume of data is present. Once enough data chunks are buffered to fill up the predetermined buffer memory (e.g., upload package buffer shown with respect to FIG. 2), the system 114 creates an upload package 116 having only the chunks with the dissimilar hash values. The archiving service systems save the upload package 116 to the storage service datastore.

In one aspect, when a user of the hosted service system 102 determines that a prior backup is needed (e.g., catastrophic data loss, data corruption, unintended data overwrite, etc.) a recovery package 120 is retrieved (via the archiving service systems 114, or another service) from the storage service datastore 118 and forwarded to the hosted service systems 102. The recovery package 120 can be unpacked (e.g., decrypted, unzipped, etc.) and installed back to the endpoint datastore making the request.

Figure 2:
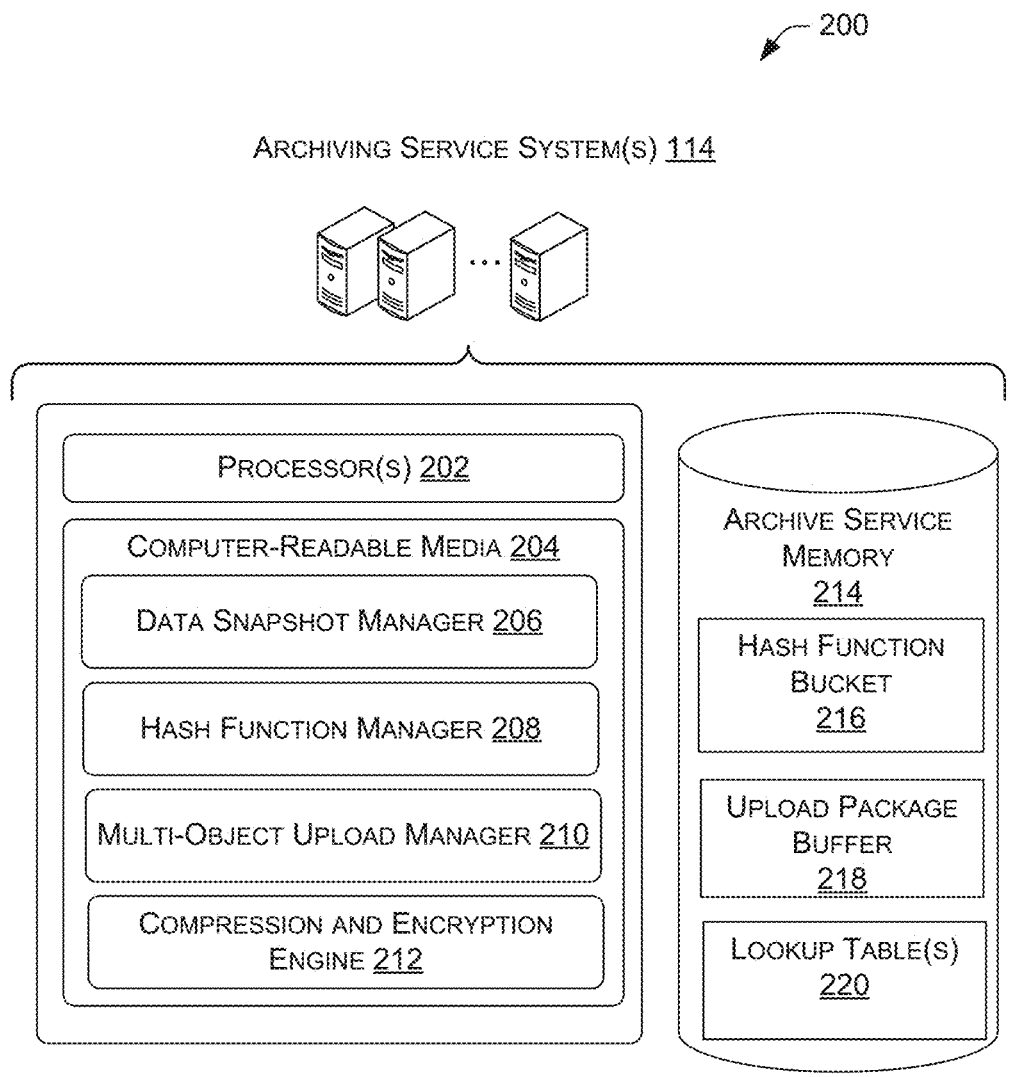
FIG. 2 is a schematic diagram of the illustrative computing architecture of the archiving service system, as shown in FIG. 1, according to example embodiments of the disclosure.

FIG. 2 is a block diagram of an illustrative computing architecture 200 of the analytics service system(s) 120, as shown in FIG. 1, according to example embodiments of the disclosure. The computing architecture 200 may be implemented in a distributed or non-distributed computing environment.

The computing architecture 200 may include one or more processors 202 and one or more computer readable media 204 that stores various modules, applications, programs, or other data. The computer-readable media 204 may include instructions that, when executed by the one or more processors 202, cause the processors to perform the operations described herein for the analytics service system(s) 120.

In some implementations, the processors(s) 202 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 202 may possess its own local memory, which also may store program modules, program data, and/or one or more operating systems. The one or more processor(s) 202 may include one or more cores.

Embodiments may be provided as a computer program product including a non-transitory machine-readable storage medium having stored thereon instructions (in compressed or uncompressed form) that may be used to program a computer (or other electronic device) to perform processes or methods described herein. The computer-readable media 204 may include volatile and/or nonvolatile memory, removable and non-removable media implemented in any method or technology for storage of information, such as computer-readable instructions, data structures, program modules, or other data. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In some embodiments, the computer-readable media 204 may store a data snapshot manager 206, a hash function manager 208, a multi-object upload manager 210, and a compression and encryption engine 212. The computing architecture 200 may include and/or have access to an archive service memory 214.

The data snapshot manager 206 may include instructions stored therein that enables the processor(s) 202 to perform the various functions and steps for generating an archive database on the storage service datastore 118. In some example embodiments, the processor(s) 202 may evaluate a data snapshot to determine its overall properties (e.g., volume size, organization, structure, etc.) and determine the most appropriate upload chunk size. Smaller chunk size results in identifying more duplicates, but incurs additional costs in terms of deduplication time and larger sized lookup tables. Larger chunk size results in faster duplication and smaller size of chunk look up tables, but costs storage capacity as there are fewer storage savings. In one aspect, the data snapshot manager may evaluate chunkسizes with respect to known effects on storage usage and file sizes. In other aspects, the chunk sizes may be user-configurable, and as such, the data snapshot manager may include a user interface portion for querying a user for input to select the chunk size.

In other aspects, the data snapshot manager 206 may receive assigned (or selected) hash functions from the hash function bucket 216 that is managed by the hash function manager 208, and evaluate the hash values of the data chunks.

The multi-object upload manager 210 may include instructions stored therein for working in conjunction with the compression and encryption engine 212 to prepare upload packages (e.g., upload package 116) for upload to the storage service data store 118. The archive service memory 214 can further include the hash function bucket 216, an upload package buffer 218, and one or more lookup tables 220. The hash function bucket 216 and the upload package buffer 218 may be controlled by the multi-object upload manager 210.

The hash function bucket 216 may store the hash functions to be used in embodiments described herein. For example, the hash function bucket 216 may store hash functions such as, for example, BSD checksum, CRC-16, CRC-31, CRC-64, SYSV checksum, MD6, SHA-1, SHA-224, SHA256, SHA384, SHA512, etc. Although many hash functions exist, it may be stated that they can be divided into at least two discernable categories: a first category can include simple hash functions that require little storage for hash values and necessitate little processing capacity (e.g., SHA-1, MD2, MD4, MD5, etc.). In another category, some hash functions (referred to herein as complex hash functions) may require greater volumes of storage space for resulting hash values, but may reduce the possibility of hash collisions (for example, MD6, RIPEMD-320, RIPEMD-160, etc.).

According to one example embodiment, the hash function bucket 216 may include a plurality of hash functions categorized into simple and complex categories. The hash function manager 208 may randomly select simple hash functions to determine whether two data chunks have the same information. In the event that the hash function manager 208 determines a hash value match, the hash function manager 208 may randomly select another function from the complex hash function category to verify that that a hash collision does not exist that provided a false match.

The upload package buffer 218 is a memory storage buffer configured for storing multiple data chunks until a predetermined buffer capacity is reached. For example, it may be advantageous to avoid overwhelming the storage service datastore 118 by uploading too many individual objects. For example, in one example embodiment, a 100 GB endpoint datastore may result in 25 million data chunks that would (at least in part) be uploaded to the storage service datastore 118. While these data chunk numbers and data volumes are non-limiting examples, it should be appreciated that the schema described herein can buffer multiple data chunks until a predetermined buffer volume is filled. An example buffer volume may be 128 MB of data. In one aspect, the upload package buffer 218 may store data chunks from one or more endpoints, along with the corresponding lookup table files associated with the chunks. In one aspect, a plurality of data chunks may be loaded to the upload package buffer 218 by the multi-object upload manager 210, where the plurality of data chunks are associated with the same endpoint datastore. In this case, a single lookup table may be associated with the plurality of data chunks. In another aspect, the upload package buffer 218 may store data chunks from more than one single endpoint datastore, and corresponding lookup tables associated with each endpoint datastore's data chunks.

Figure 3:
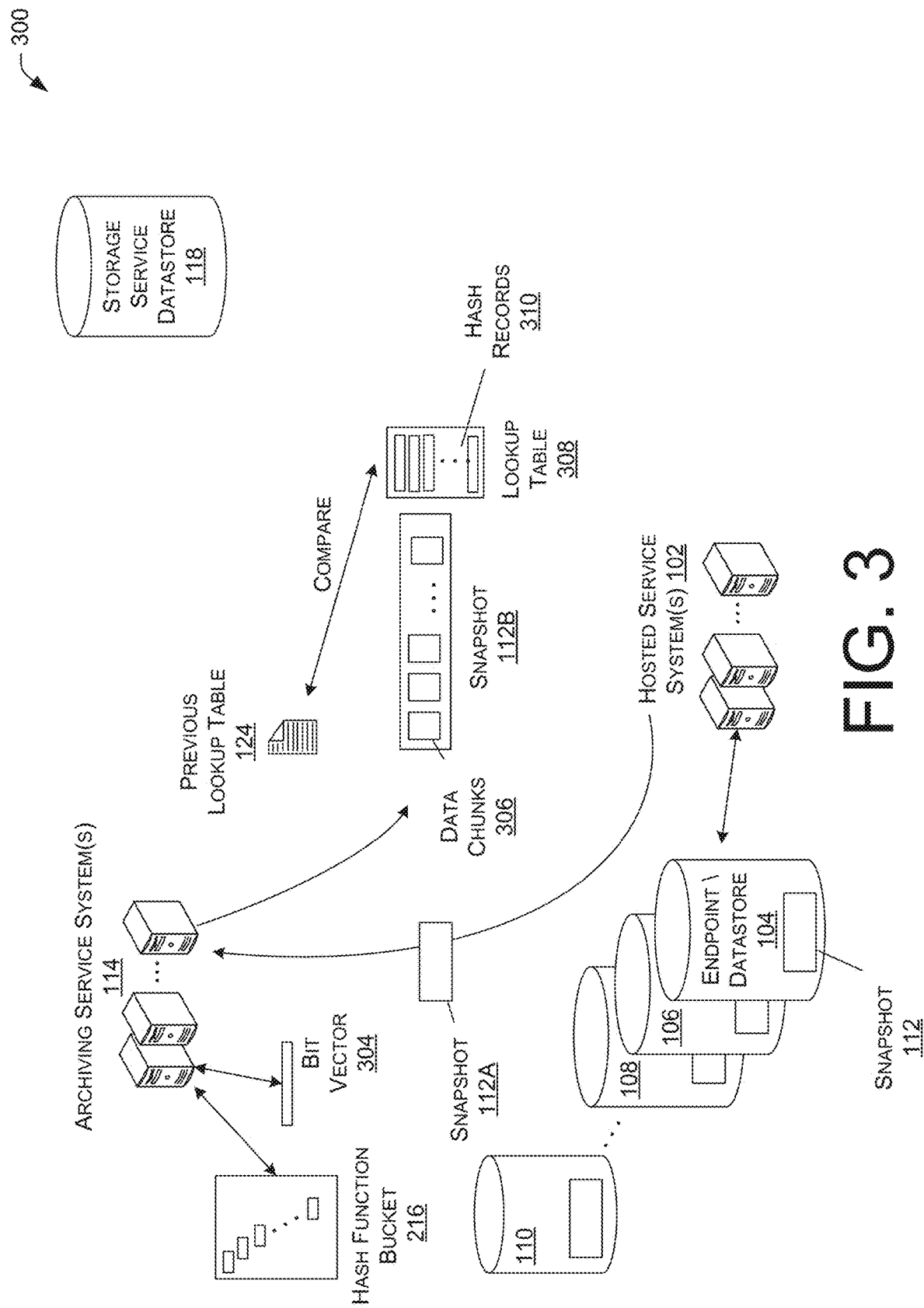
FIG. 3 is a schematic diagram of the illustrative computing architecture of FIG. 1 used for generating a plurality of data chunks in a data snapshot with the archiving service system, according to example embodiments of the disclosure.

FIG. 3 is a schematic diagram of the illustrative computing architecture 100 of FIG. 1 used for generating a plurality of data chunks 306 from a data snapshot 112A, according to example embodiments of the disclosure. In this figure, an example process of archiving deduplication in the computing environment 100 is shown, and more particularly, an example process for using the archiving service system 114 to retrieve a data snapshot 112A, and apply hash functions from the hash function bucket 216, along with a bit vector 304, to produce hash records 310 that may be used to evaluate each of the data chunks 306 with the hash functions selected (or assigned) from the hash function bucket 216.

Starting first with FIG. 3, the processors 202 of the archiving service system 114 may download a snapshot 112 of the endpoint datastore 104, and process the snapshot by dividing the snapshot 112A into a plurality of data chunks 306. The divided snapshot 112B is depicted with the multiple data chunks 306. In some embodiments the data chunks 306 are the same size with respect to one another. In another embodiment, the data chunks 306 may not be identically sized.

The hash function manager 208 may then select a plurality of hash functions from the hash function bucket 216. Accordingly, the hash function manager 208 performs a universal hashing operation by picking, for each data chunk, a hash function at random from a family of hash functions in the hash function bucket 216. The hash function manager essentially applies a Bloom filter operation to each data chunk. This guarantees a low number of hash collisions by applying a deterministic function to each data chunk.

To check to see if two data chunks are identical (or stated another way, test a set of data for membership in a second set of data) the hash function manager 208 may set a size bit vector to test the membership of the data in one data chunk with a set of data in a second data chunk. In one aspect, the bit vector may be sized randomly by the processor. In another aspect, it may be a set value subject to system optimization. To test for membership (indicating that the data chunks are the same with respect to data content) the hash function manager 208 hashes the string of the bit vector 304 with the same selected hash function, then checks to see if those values are set in the bit vector.

In order to test one data chunk against an earlier saved data chunk from the same endpoint datastore, the data chunks must be saved to the storage service datastore 118 a first time, and their hash information for each data chunk must be recorded on a lookup table. One example of a lookup table from the initial (previous) snapshot 112 is depicted as previous lookup table 124. The lookup table has a plurality of hash records indicative of hash function values (among other information) from the earlier snapshot. The previous lookup table 124 is first downloaded from the storage service datastore 118 by the archiving service system 114. After taking the subsequent snapshot 112A, and processing the snapshot by dividing and hashing the data chunks 306, the data snapshot manager 206 and/or the hash function manager 208 create a second lookup table 308. The lookup table 308 includes a plurality of hash records 310. Accordingly, the data snapshot manager 206 identifies any dissimilar hash values between the first lookup table 124 and the corresponding hash values in the second lookup table 308.

Figure 4:
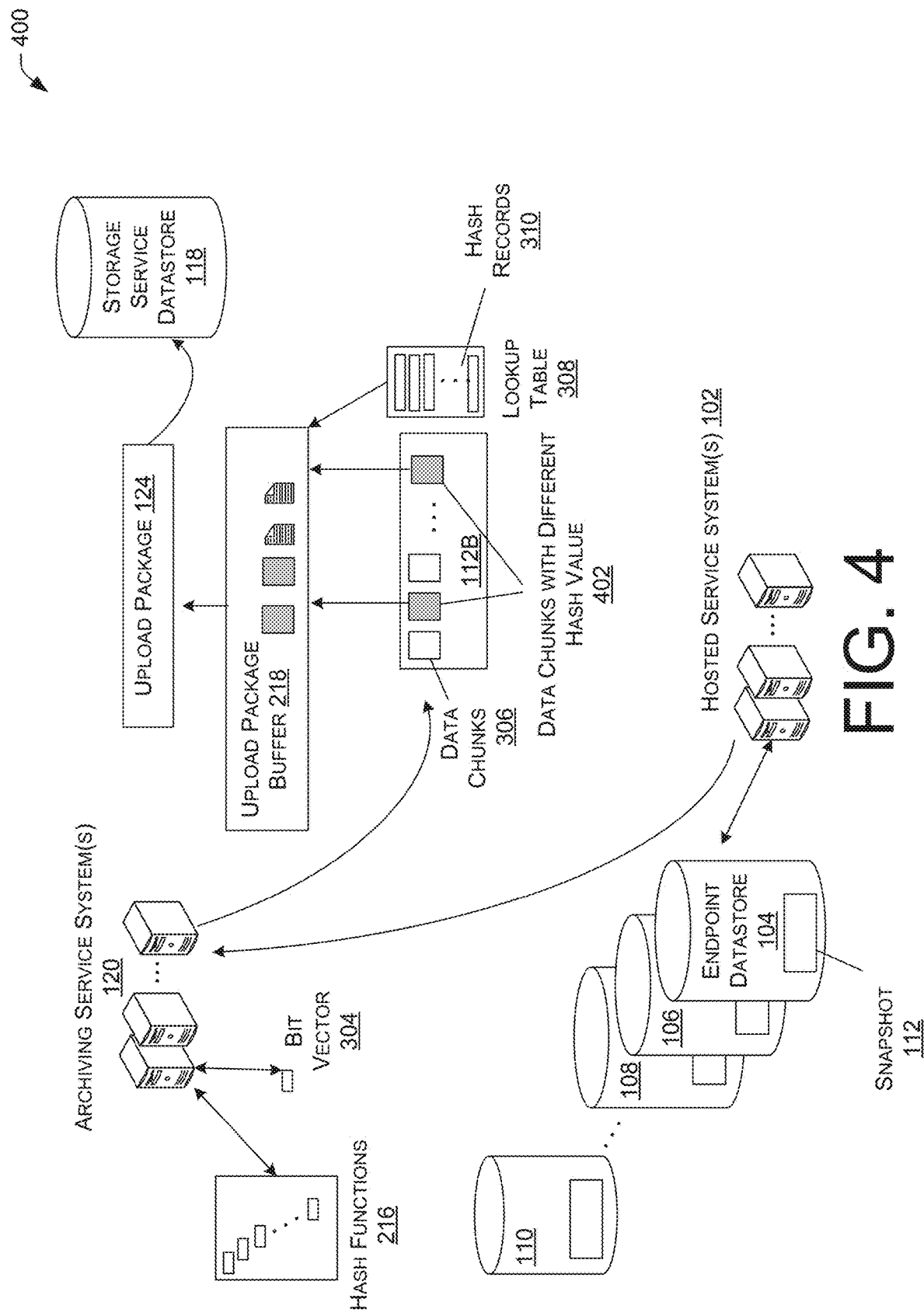
FIG. 4 is a schematic diagram of the illustrative computing architecture of FIG. 1 used for generating an upload package with the archiving service system, according to example embodiments of the disclosure.

FIG. 4 is a schematic diagram of the illustrative computing architecture of 100 FIG. 1 used for generating an upload package 124 with the archiving service system 114, according to example embodiments of the disclosure. According to the example embodiment of FIG. 4, the data snapshot manager 206 identifies, among the data chunks 306, the data chunks with different hash values 402. Stated in another way, the data chunks with different hash values 402 have elements that are not shared with their counterpart data chunks from the previously-saved data snapshot 112 (as recorded on the previous lookup table 124). This affirmative determination is made when the hash records 310 indicate a mismatch with the hash records of the previous lookup table 124.

After identifying the data chunks with different hash values (containing the data that must be uploaded to the storage service datastore 118), the multi-object upload manager 210 and the compression and encryption engine 212 may create an archive (upload package 116), compress all of the data chunks having different hash values 402, encrypt the data chunks 402, and save the compressed and encrypted data chunks in an upload package buffer 218. By grouping the data chunks together in the upload package buffer 218 until a predetermined buffer file size is reached, the storage service datastore is less likely to be overwhelmed by an unmanageable number of uploaded data chunks at one time. The upload package 124 contains the compressed, encrypted contents of the upload package buffer, and may also include the hash records 312 corresponding to each of the data chunks having the different hash values 402.

Figure 5:
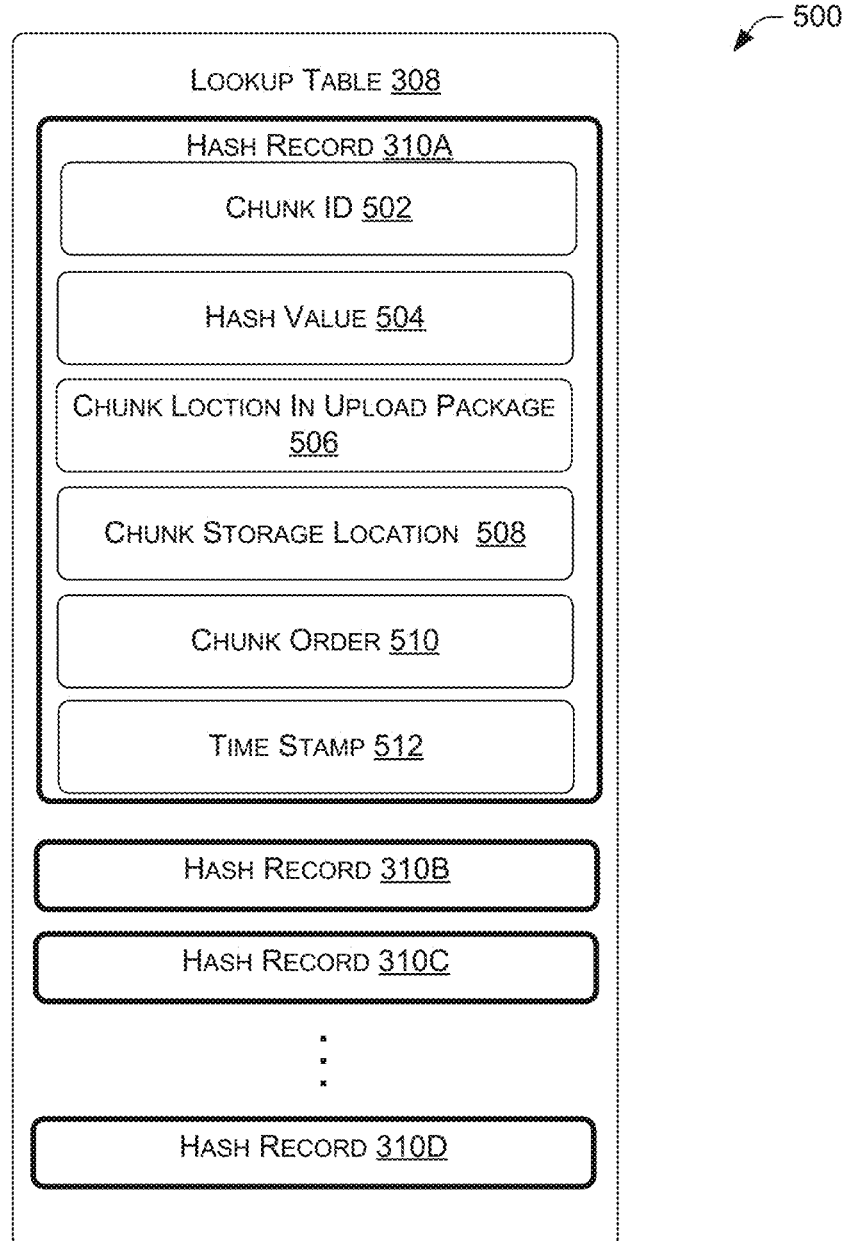
FIG. 5 is a block diagram of a hash record among a plurality of hash records in a lookup table, according to example embodiments of the disclosure.

FIG. 5 is a block diagram 500 of a hash records 310 among a plurality of hash records 310A, 310B, 310C and 310D in the example lookup table 308, according to one or more example embodiments of this disclosure. The example lookup table 308 includes a plurality of hash records (310A-310D), where there is one hash record 310 created in the lookup table 308 for each of the data chunks 306. Although four data chunks are represented in FIG. 5, it should be appreciated that any number of data chunks are contemplated that make up a data snapshot.

According to one non-limiting example embodiment, a hash record 310A includes information that uniquely identifies a complete data chunk. For example, the hash record 310A may include a chunk identification (ID) 502 to identify a data chunk. In other aspects, the hash record 310 may include hash value 504 that also uniquely identifies the data chunk, and is indicative of a calculated hash value associated with that data chunk.

The hash record 310A may also include information indicative of the chunk location in the upload package 506. For example, the chunk location 506 may indicate an offset for the start of a particular data chunk with respect to the upload package 116.

The hash record 310A may also include information indicative of a chunk storage location 508 in the storage service datastore. In some aspects, the chunk storage location 508 is needed to locate the data chunk in the storage service datastore 118 in the instance of a request for a restore operation (e.g., an action by the archiving service system 114 in response to a request for a recovery package 120, as shown in FIG. 1).

In some aspects, the hash record 310A may also include information indicative of a chunk order 510 indicative of a relative position of the chunk with respect to the assembled snapshot of the endpoint datastore from which it was derived. This information may be needed during a restore operation when downloading and assembling stored data chunks from the storage service datastore 118. In other aspects the hash record 310A may also include timestamp information 512 indicative of a time and date at which the snapshot was taken.

Figure 6:
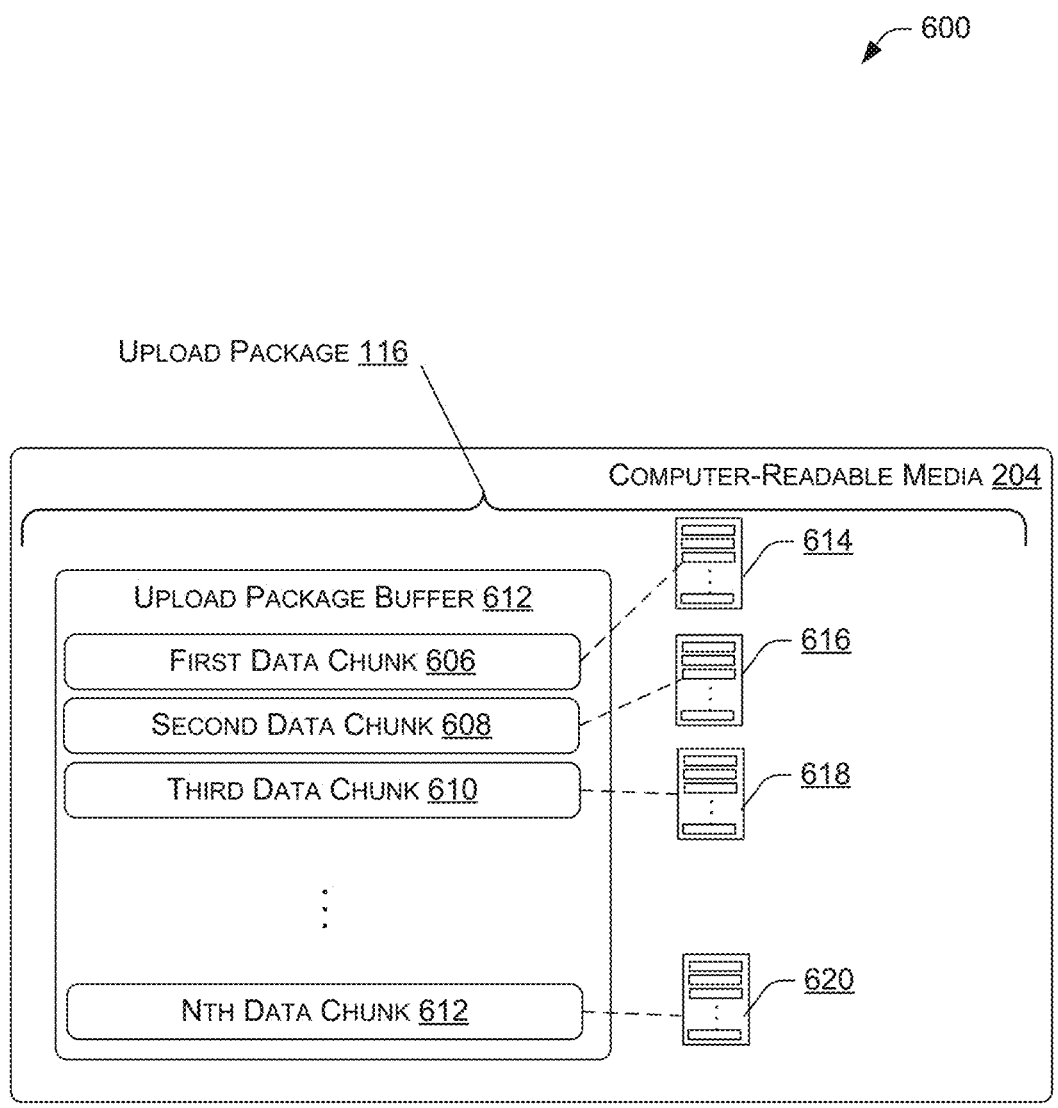
FIG. 6 is a block diagram of an upload package for uploading data chunks to a datastore, according to example embodiments of the disclosure.

FIG. 6 is a block diagram of an upload package 116 in an example computer-readable media 204, according to example embodiments of the disclosure. The upload package 116 includes a plurality of data chunks 606, 608, 610, 612, etc. The relative order of the data chunks 606-612 may be saved in the chunk storage location 506, which indicates the relative location of a data chunk in the upload package 116. For example, second data chunk 608 may begin at hexadecimal location XYZ, while third data chunk 610 may begin at hexadecimal location XZZ, etc.

Each upload package may include one or more lookup tables 614, 616, 618, 620, etc. For each endpoint datastore represented (at least in part) by one or more of the data chunks 606-612, there may be a lookup table having the hash records associated with that snapshot. Exemplary hash records are depicted in FIG. 3. Although four lookup tables are shown in FIG. 6, it should be appreciated that any number of data chunks and/or lookup tables are contemplated. For example, when all of the data chunks in the upload package 116 are from the same snapshot, then there may be only one lookup table present having information pertaining to those data chunks. As shown in FIG. 6, there are four separate snapshots represented in the upload package 116, demonstrated by the depiction of four separate lookup tables 614-620 included with the data chunks 606-612. Any combination of data chunks and corresponding lookup tables is contemplated.

Figure 7:
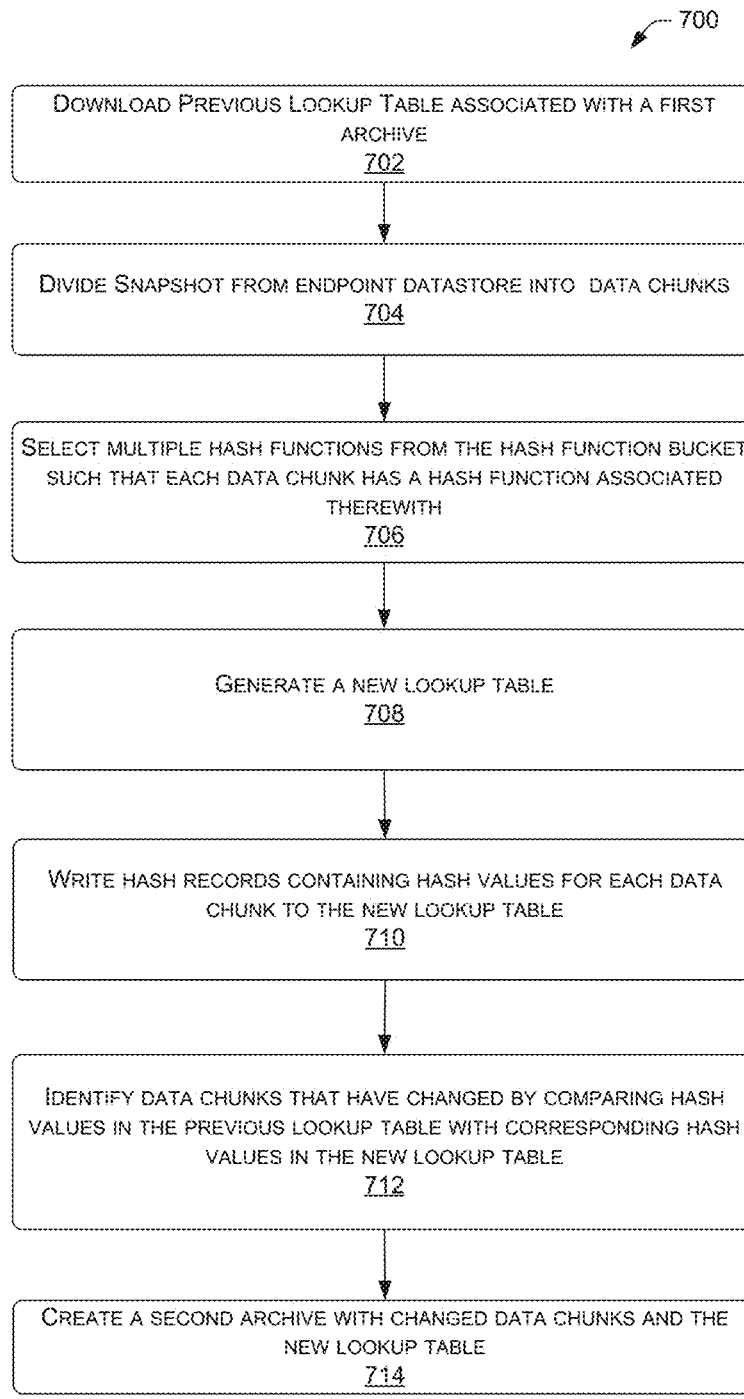
FIG. 7 is a flow diagram of an illustrative method to generate an archive database on a datastore, according to example embodiments of the disclosure.
Figure 8:
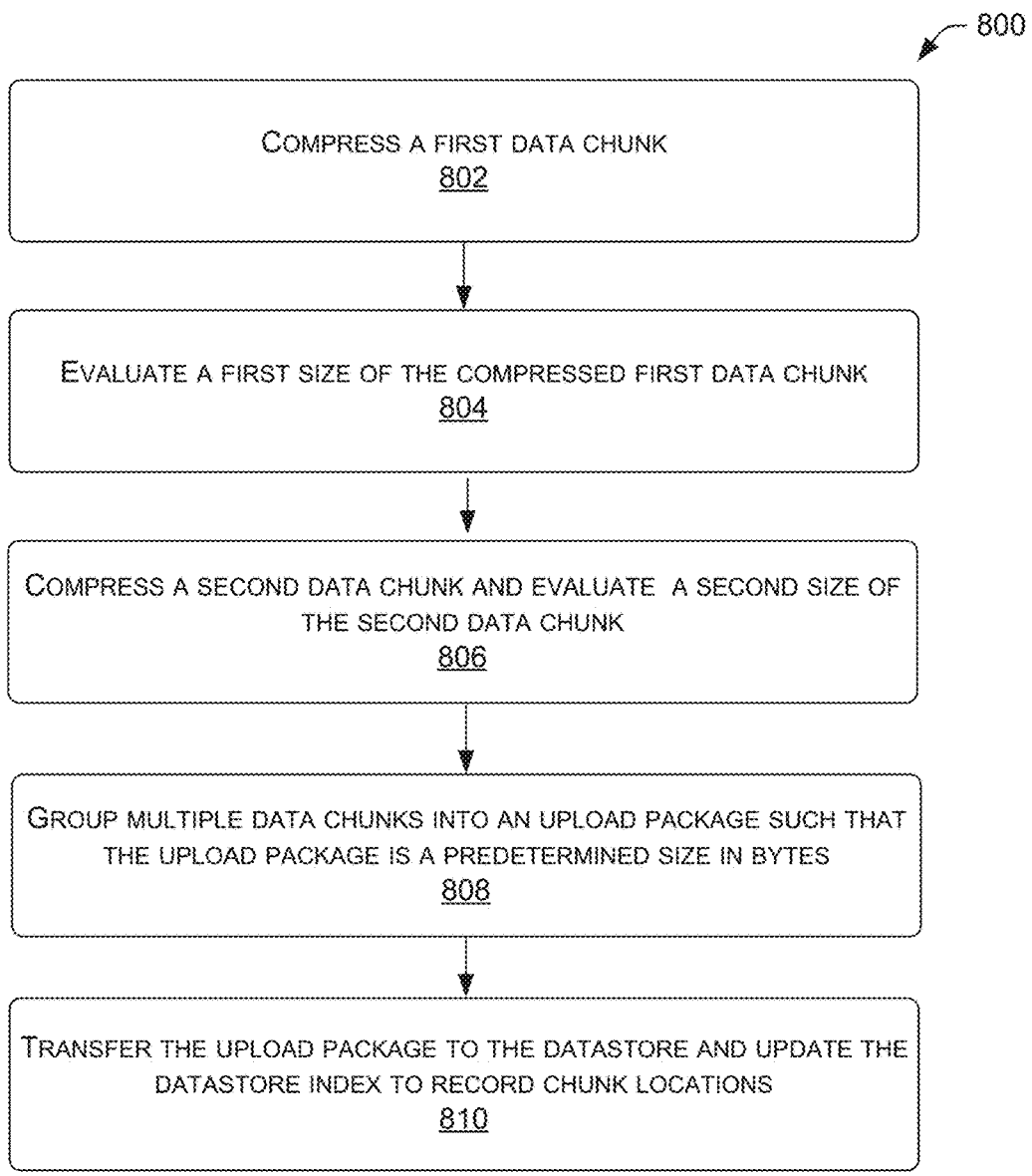
FIG. 8 is a flow diagram of an illustrative method to generate a transfer package and upload the transfer package to an archive database on a datastore, according to example embodiments of the disclosure.

FIGS. 7 and 8 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Looking now at FIG. 7, as shown in block 702, the system downloads the previous lookup table. A system processor in an archiving service system can perform acts to generate an archive database on a datastore. The archive database may store datasets backed up from an address that an application uses to connect with the archiving service systems and the storage service datastores (the address referred to herein as an endpoint).

At block 704, the processor of the archiving service system starts by dividing a snapshot of all of the data from an endpoint that is designated to be backed up into chunks of data. As used herein and discussed in detail above, the snapshot of data that records the state of one or more client computing systems at a particular point in time is referred to herein as a data snapshot. That is to say, the data snapshot is a recorded machine state of a computing system at a particular point in time, embodied as a set of data that can be used to re-create the computing systems (and their state) at a later date.

After recording a data snapshot of the client computing system, the archiving service divides the data snapshot into a plurality of data chunks (known in terms of Bloom filter as k parts, where k is a positive integer). According to one embodiment, a chunk size can range from 4 KB to 96 KB of data. Other chunk sizes are contemplated. It should be appreciated that k is a variable that determines the relative size of the data chunks. Smaller chunk size can result in identifying more duplicates (and thus, more conservation of datastore space), but can also result in additional computing costs in terms of deduplication time and larger size of chunk look up table. As the data chunks increase in size (e.g., k is smaller), the smaller possibility exist that any two data chunks contain the same data. Larger chunk size results in faster duplication and smaller size of the chunk look up tables. However larger chunk sizes come at the cost of less storage savings.

Once the system divides the data snapshot into data chunks, at block 706, the processor selects from a plurality of hash functions stored in the hash function bucket, a respective hash function for each of the plurality of data chunks. Stated in another way, the archiving service randomly picks a hash function from a selected set of hash functions for each data chunk from the hash function bucket. In some example embodiments, the hash function bucket may be organized into categories of hash functions having particular mathematical properties. For example, a complex hash function may be assigned (or selected by the processor) in response to identification of a possible hash collision.

As earlier explained, the number of hash functions available for selection is also a variable with performance advantages and disadvantages based on the number of hash functions and/or the type of hash functions available for selection in the hash function bucket. For example, more hash functions in the hash function bucket can bring a higher level of randomness (and thus, increased probability of avoiding hash collisions) than having fewer hash functions in the bucket. But more hash functions can come at the cost of computing storage and speed due to the higher number of bits stored for the hash values in larger functions.

At block 708, the system then writes, for each of the data chunks of the plurality of data chunks, a hash record to a lookup table. To do this, the processor assigns a hash function to each of the data chunks of the plurality of data chunks using the respectively selected hash functions from the hash function bucket, and evaluates each hash value using a key value that is based on the set bit values of the bit vector. This lookup table corresponds to the data chunks in a single data snapshot, and contains hash records for each of the data chunks associated with that single snapshot. The hash record contains, among other things, the calculated value of the hash function, and other information that can be used to organize the unpacked data chunks at the datastore and retrieve any archived data chunks during a restore operation. Because the data chunks may not be stored in contiguous memory locations at the datastore, a map is needed to retrieve all of the portions of the snapshot and reassemble them to recreate the machine state at the time of the snapshot. This information is also stored in the hash record, which is permanently associated with each data chunk.

Assuming this process has been completed at least once, where every data chunk is processed and recorded on a corresponding lookup table, the archive system can now, at the next data snapshot, determine which corresponding chunks have changed since the last snapshot and which data chunks remain the same.

At block 710, the system downloads the previous lookup table associated with the snapshot at issue, and performs the hash value assignment and calculation steps again for each of the data chunks. The processor creates a second lookup table for the present snapshot, which corresponds directly with the lookup table from the previous snapshot.

At block 712, the system identifies any dissimilar hash values between the first lookup table and corresponding hash values in a second lookup table. Any dissimilar hash values indicate that there is changed data, and thus, a need to upload that data chunk to the datastore for archiving. If there is a match between a particular hash value in the first lookup table and a corresponding hash value in the second lookup table, there may be a data match such that the chunks are identical. There are known utilities for comparing creating and comparing hash values. In general, when storing a plurality of records (e.g., data chunk hash values) in a large unsorted file, one may use a hash function to map each record to an index into a table T, and to collect in each bucket T[i] a list of the numbers of all records with the same hash value i. Once the table is complete, any two duplicate records will end up in the same bucket. The duplicates can then be found by scanning every bucket T[i] that contains two or more members, fetching those records, and comparing them via a processor. With a table of appropriate size, this method is one example of an efficient search and compare algorithm. It should be appreciated that there are numerous ways to search and compare a plurality of values to find a match between the values, and as such, this example method is not limiting.

In one embodiment, to be sure there is not a hash collision, a second level of verification may be performed. The storage management system may then perform a sequential data value comparison (e.g., a bit-by-bit comparison) of at least some of the new sequential data portion corresponding to the generated hash value and of the identified existing sequential data portion, based on the bit vector, to identify a contiguous data subset of each of the new and existing data groups that are identical. In some aspects, a simple hash function may be used for the first identification of dissimilar hash values due to the speed and bit storage benefits associated with determining that two data sets (chunks) are dissimilar. In other aspects, when a "first pass" of the hash function yields a hash value equivalent to the corresponding hash value in a previous archiving of the same data chunk, it may be beneficial to select among the complex list of hash functions to provide a higher probability of eliminating false matches (hash collisions).

At block 714, the archiving service system processor creates the second archive. The previous (first) archive is not overwritten. Instead, the archive system creates a second archive by saving only the dissimilar data chunks to the storage service datastore. The plurality of dissimilar data chunks may be respectively associated with the dissimilar hash values between the first table and the second table.

FIG. 8 is a flow diagram of an illustrative method to generate a transfer package and upload the transfer package to an archive database on a datastore, according to example embodiments of the disclosure. When a first data chunk is determined to be unique with respect to the prior lookup table (i.e., the data chunk contains new or different data and is to be archived) the system adds the block to a buffer, along with other data chunks to be uploaded to the storage service datastore, until the buffer is filled to capacity. One benefit of buffering the upload package is avoidance of congestion at the storage service datastore by uploading millions of data objects simultaneously. Accordingly, at block 802, the processor may compress the first data chunk to be uploaded to the next archive digest. In some aspects, the processor may evaluate the size of the first data chunk after compressing the data chunk, as depicted in block 804. In other aspects, the processor may omit block 804 and compress a plurality of data chunks simultaneously.

At block 806, the processor may continue to compress another data chunk and evaluate the size of the upload package until the upload package buffer is filled to capacity. While the size (capacity) of the unload package buffer is variable and based on system optimization, it should be appreciated that the sequence of operations described herein is unique, and results in increased system throughput by allowing a faster identification of data to be archived while optimizing the storage of archive volumes.

At block 808, the processor may group the multiple data chunks into an upload package such that the upload package is a predetermined size in bytes. For example, an optimal upload package may be 4 KB, 8 KB, etc. In other aspects an optimal upload package may fall within a predetermined range of file size (e.g., between 4 and 4.5 KB).

As shown in block 810, the processor may transfer the upload package to the datastore and update the datastore index to record the chunk locations.

Figure 9:
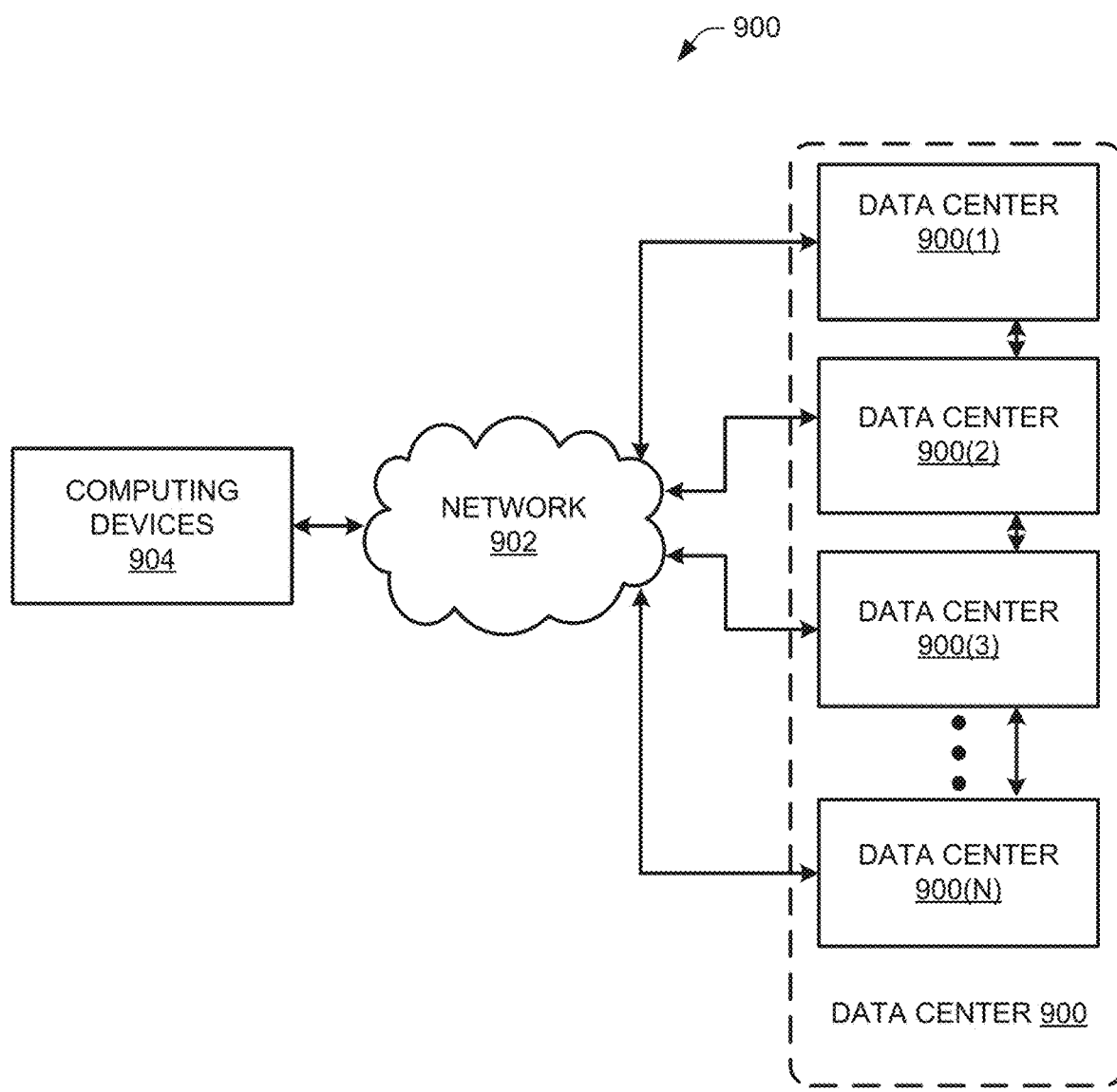
FIG. 9 is a system and network diagram that shows an illustrative operating environment that includes a system that can be configured to implement aspects of the functionality described herein, according to example embodiments of the disclosure.

FIG. 9 is a system and network diagram that shows an illustrative operating environment that includes a data center 900 that can be configured to implement aspects of the functionality described herein, according to example embodiments of the disclosure. As discussed briefly above, the data center 900 can execute archive services that provide improved avoidance of hash collisions. As discussed above, the system may be part of a larger system that provides the additional computing resources that include, without limitation, data storage resources, data processing resources, such as virtual machine (VM) instances, networking resources, data communication resources, network services, and other types of resources.

Each type of computing resource provided by system, or by a larger system of which the system is a part, can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The system, or a larger system of which the system is a part, can also be configured to provide other types of computing resources not mentioned specifically herein.

The computing resources provided by system, or a larger system of which the system is a part, are enabled in one implementation by one or more data centers 900(1), 900(2), 900(3), . . . , 900(N). The data centers are facilities utilized to house and operate computer systems and associated components. The data centers typically include redundant and backup power, communications, cooling, and security systems. The data centers can also be located in geographically disparate locations. One illustrative configuration for a data center that can be utilized to implement the technologies disclosed herein will be described below with regard to FIG. 10.

The users of the system can access the computing resources, such as the archiving service system(s) 130, the analytics service system(s) 120, and/or the archiving service system(s) 120, provided by the system over a network 902, which can be a wide area communication network ("WAN"), such as the Internet, an intranet or an Internet service provider ("ISP") network or a combination of such networks. For example, and without limitation, a computing device 904 (e.g., the client device, application developer system, etc.,) operated by a user of the system can be utilized to access the system by way of the network 902. It should be appreciated that a local-area network ("LAN"), the Internet, or any other networking topology known in the art that connects the data centers to remote users and other users can be utilized. It should also be appreciated that combinations of such networks can also be utilized.

Figure 10:
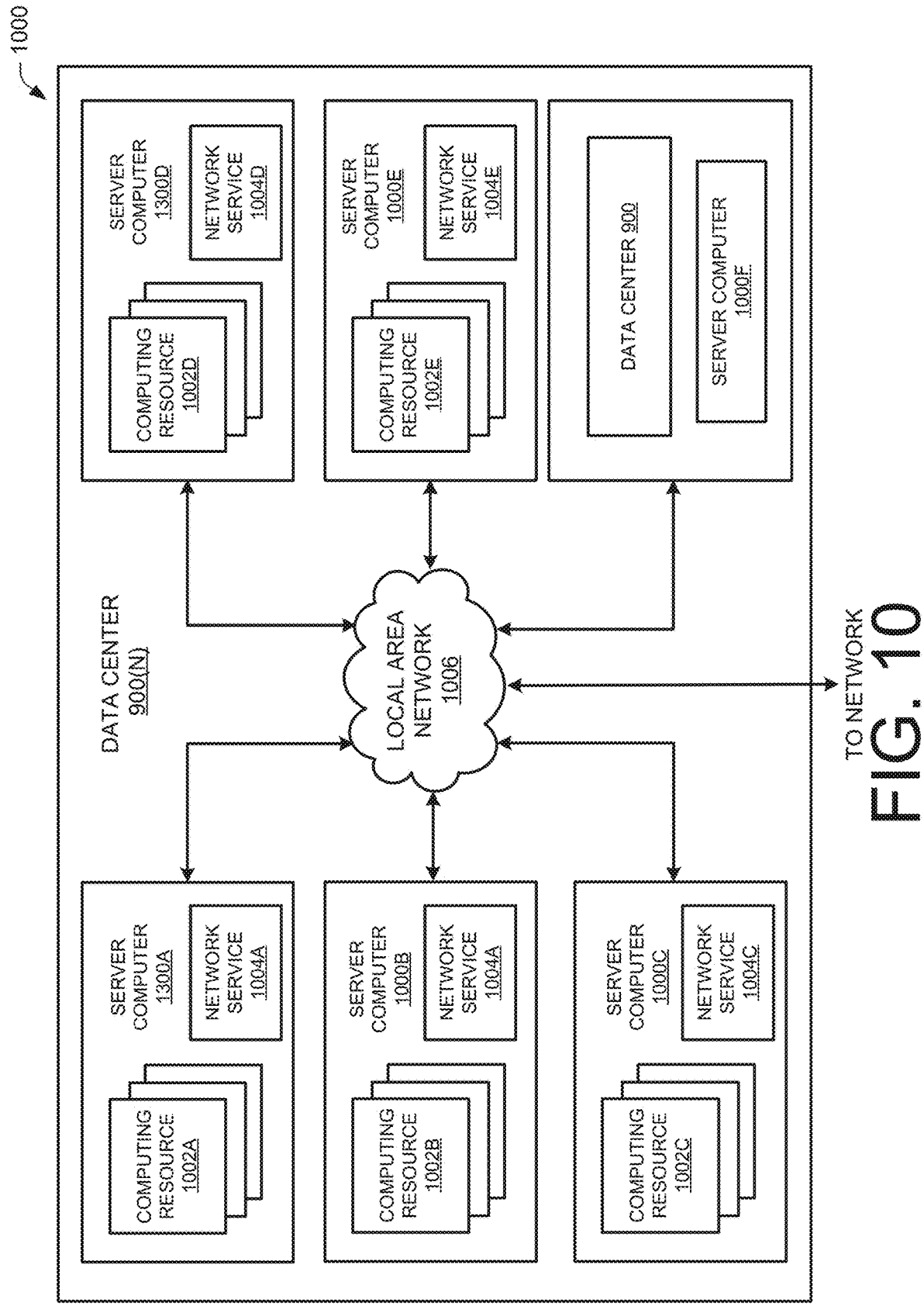
FIG. 10 is a computing system diagram illustrating a configuration for a data center that can be utilized to implement aspects of the technologies disclosed herein, according to example embodiments of the disclosure.

FIG. 10 is a computing system diagram illustrating a configuration for a data center 900(N) that can be utilized to implement aspects of the technologies disclosed herein, according to example embodiments of the disclosure.

These technologies may include the archiving service system(s) 114, the analytics service system(s) 120, and/or the archiving service system(s) 120. The example data center 900(N) shown in FIG. 10 includes several server computers 1000A-1000F (collectively 1000) for providing the computing resources 1002A-1002E (collectively 1002), respectively.

The server computers 1000 can be standard tower, rack-mount, or blade server computers configured appropriately for providing the various computing resources described herein (illustrated in FIG. 10 as the computing resources 1002A-1002E). As mentioned above, the computing resources 1002 provided by the system, or a larger system of which the system is a part, can include, without limitation, analytics applications, data storage resources, data processing resources such as VM instances or hardware computing systems, database resources, networking resources, and others. Some of the servers 1000 can also be configured to execute network services 1004A-1004E (collectively 1004) capable of instantiating, providing and/or managing the computing resources 1002, some of which are described in detail herein.

The data center 900(N) shown in FIG. 10 also includes a server computer 1000F that can execute some or all of the software components described above. For example, and without limitation, the server computer 1000F can be configured to execute the archiving service system(s) 130. The server computer 1000F can also be configured to execute other components and/or to store data for providing some or all of the functionality described herein. In this regard, it should be appreciated that components or different instances of the archive service systems 140 can execute on many other physical or virtual servers in the data centers 900 in various configurations.

In the example data center 900(N) shown in FIG. 10, an appropriate LAN 1006 is also utilized to interconnect the server computers 1000A-1000F. The LAN 1006 is also connected to the network 902 illustrated in FIG. 9. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 900(1)-(N), between each of the server computers 1000A-1000F in each data center 900, and, potentially, between computing resources 1002 in each of the data centers 900. It should be appreciated that the configuration of the data center 900 described with reference to FIG. 10 is merely illustrative and that other implementations can be utilized.

Figure 11:
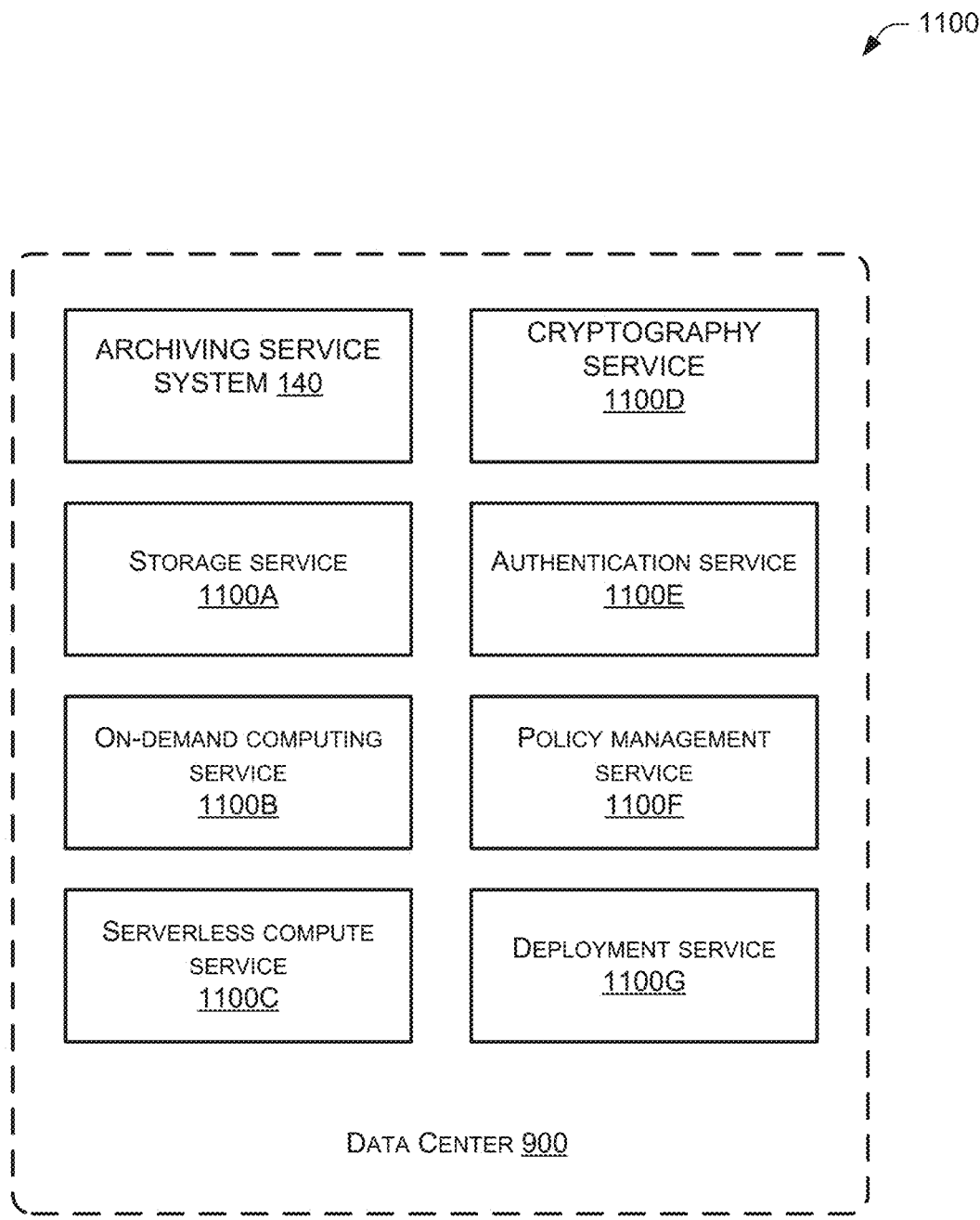
FIG. 11 is a network services diagram that shows aspects of several services that can be provided by and utilized within a system, or a larger system of which the system is a part, which is configured to implement the various technologies disclosed herein, according to example embodiments of the disclosure.

FIG. 11 is a network services diagram that shows aspects of several services that can be provided by and utilized within a system, or a larger system of which the system is a part, which is configured to implement the various technologies disclosed herein, according to example embodiments of the disclosure.

In particular, and as discussed above, the system, or a larger system of which the system is a part, can provide a variety of network services to users and other users including, but not limited to, the archiving service system(s) 114, the hosted service systems 102, and/or the storage service datastore 118, a storage service 1100A, an on-demand computing service 1100B, a serverless compute service 1100C, a cryptography service 1100D, an authentication service 1100E, a policy management service 1100F, and a deployment service 1100G. The system, or a larger system of which the system is a part, can also provide other types of network services, some of which are described below.

It is also noted that not all configurations described include the network services shown in FIG. 11 and that additional network services can be provided in addition to, or as an alternative to, the services explicitly described herein. Each of the services shown in FIG. 11 can also expose web service interfaces that enable a caller to submit appropriately configured API calls to the various services through web service requests. The various web services can also expose GUIs, command line interfaces ("CLIs"), and/or other types of interfaces for accessing the functionality that they provide. In addition, each of the services can include service interfaces that enable the services to access each other. Additional details regarding some of the services shown in FIG. 11 will now be provided.

The storage service 1100A can be a network-based storage service that stores data obtained from users of the system, or a larger system of which the system is a part. The storage service 1100A may be the system managing the storage service datastore 118. The data stored by the storage service 1100A can be obtained from computing devices of users, such as one or more users of the hosted service systems 102.

The on-demand computing service 1100B can be a collection of computing resources configured to instantiate VM instances and to provide other types of computing resources on demand. For example, a user of the system, or a larger system of which the system is a part, can interact with the on-demand computing service 1100B (via appropriately configured and authenticated API calls, for example) to provision and operate VM instances that are instantiated on physical computing devices hosted and operated by the system, or a larger system of which the system is a part. The VM instances can be used for various purposes, such as to operate as servers supporting the network services described herein, a web site, to operate business applications or, generally, to serve as computing resources for the user.

Other applications for the VM instances can be to support database applications, electronic commerce applications, business applications and/or other applications. Although the on-demand computing service 1100B is shown in FIG. 11, any other computer system or computer system service can be utilized in the system, or a larger system of which the system is a part, to implement the functionality disclosed herein, such as a computer system or computer system service that does not employ virtualization and instead provisions computing resources on dedicated or shared computers/servers and/or other physical devices.

The serverless compute service 1100C is a network service that allows users to execute code (which might be referred to herein as a "function") without provisioning or managing server computers in the system, or a larger system of which the system is a part. Rather, the serverless compute service 1100C can automatically run code in response to the occurrence of events. The code that is executed can be stored by the storage service 1100A or in another network accessible location.

In this regard, it is to be appreciated that the term "serverless compute service" as used herein is not intended to infer that servers are not utilized to execute the program code, but rather that the serverless compute service 1100C enables code to be executed without requiring a user to provision or manage server computers. The serverless compute service 1100C executes program code only when needed, and only utilizes the resources necessary to execute the code. In some configurations, the user or entity requesting execution of the code might be charged only for the amount of time required for each execution of their program code.

The system, or a larger system of which the system is a part, can also include a cryptography service 1100D. The cryptography service 1100D can utilize storage services of the system, or a larger system of which the system is a part, such as the storage service 1100A, to store encryption keys in encrypted form, whereby the keys can be usable to decrypt user keys accessible only to particular devices of the cryptography service 1100D. The cryptography service 1100D can also provide other types of functionality not specifically mentioned herein.

The system, or a larger system of which the system is a part, in various configurations, also includes an authentication service 1100E and a policy management service 1100F. The authentication service 1100E, in one example, is a computer system (i.e., collection of computing resources 1002) configured to perform operations involved in authentication of users or customers. For instance, one of the services shown in FIG. 11 can provide information from a user or customer to the authentication service 1100E to receive information in return that indicates whether or not the requests submitted by the user or the customer are authentic.

The policy management service 1100F, in one example, is a network service configured to manage policies on behalf of users or customers of the system, or a larger system of which the system is a part. The policy management service 1100F can include an interface (e.g. API or GUI) that enables customers to submit requests related to the management of policy, such as a security policy. Such requests can, for instance, be requests to add, delete, change or otherwise modify policy for a customer, service, or system, or for other administrative actions, such as providing an inventory of existing policies and the like.

The system, or a larger system of which the system is a part, can additionally maintain other network services based, at least in part, on the needs of its customers. For instance, the system, or a larger system of which the system is a part, can maintain a deployment service 1100G for deploying program code in some configurations. The deployment service 1100G provides functionality for deploying program code, such as to virtual or physical hosts provided by the on-demand computing service 1100B. Other services include, but are not limited to, database services, object-level archival data storage services, and services that manage, monitor, interact with, or support other services. The system, or a larger system of which the system is a part, can also be configured with other network services not specifically mentioned herein in other configurations.

Figure 12:
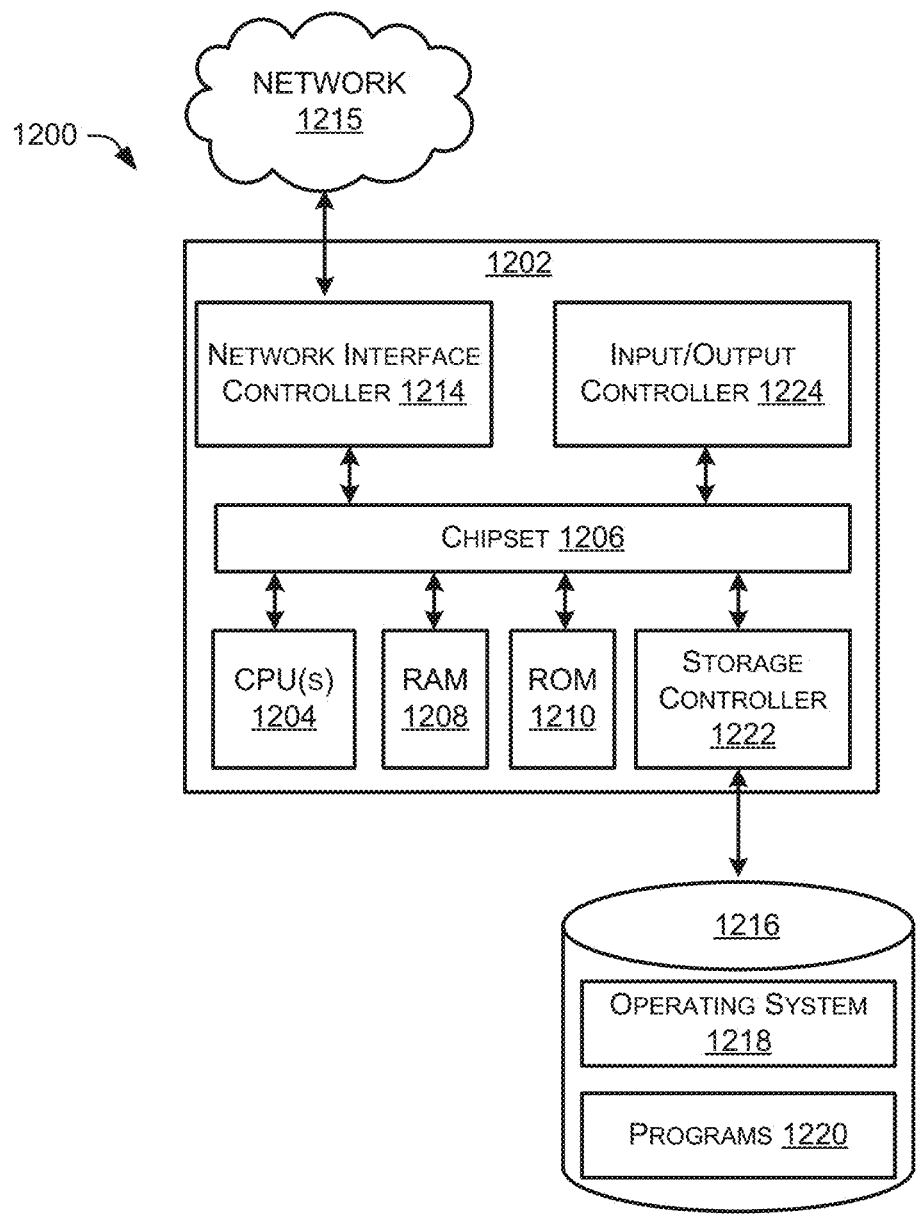
FIG. 12 is a computer architecture diagram showing an illustrative computer hardware architecture for implementing a computing device that can be utilized to implement aspects of the various technologies presented herein, according to example embodiments of the disclosure.

FIG. 12 is a computer architecture diagram showing an illustrative computer hardware architecture for implementing a computing device that can be utilized to implement aspects of the various technologies presented herein, according to example embodiments of the disclosure. The computer architecture shown in FIG. 12 illustrates a conventional server computer, workstation, desktop computer, laptop, tablet, network appliance, e-reader, smartphone, or other computing device, and can be utilized to execute any of the software components presented herein. The computer 1200 may represent architecture for a naming service, a concentrator, a reader, and/or other devices described herein.

The computer 1200 includes a baseboard 1202, or "motherboard," which is a printed circuit board to which a multitude of components or devices can be connected by way of a system bus or other electrical communication paths. In one illustrative configuration, one or more central processing units ("CPUs") 1204 operate in conjunction with a chipset 1206. The CPUs 1204 can be standard programmable processors that perform arithmetic and logical operations necessary for the operation of the computer 1200.

The CPUs 1204 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 can provide an interface to a RAM 1208, used as the main memory in the computer 1200. The chipset 1206 can further provide an interface to a computer-readable storage medium such as a read-only memory ("ROM") 1210 or non-volatile RAM ("NVRAM") for storing basic routines that help to startup the computer 1200 and to transfer information between the various components and devices. The ROM 1210 or NVRAM can also store other software components necessary for the operation of the computer 1200 in accordance with the configurations described herein.

The computer 1200 can operate in a networked environment using logical connections to remote computing devices and computer systems through a network, such as the network 1215. The chipset 1206 can include functionality for providing network connectivity through a NIC 1214, such as a gigabit Ethernet adapter. The NIC 1214 is capable of connecting the computer 1200 to other computing devices over the network 1215. It should be appreciated that multiple NICs 1214 can be present in the computer 1200, connecting the computer to other types of networks and remote computer systems.

The computer 1200 can be connected to a mass storage device 1216 that provides non-volatile storage for the computer. The mass storage device 1216 can store an operating system 1218, programs 1220, and data, which have been described in greater detail herein. The mass storage device 1216 can be connected to the computer 1200 through a storage controller 1222 connected to the chipset 1206. The mass storage device 1216 can consist of one or more physical storage units. The storage controller 1222 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1200 can store data on the mass storage device 1216 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1216 is characterized as primary or secondary storage, and the like.

For example, the computer 1200 can store information to the mass storage device 1216 by issuing instructions through the storage controller 1222 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 can further read information from the mass storage device 1216 by detecting the physical states or characteristics of one or more particular locations within the physical storage units.

In addition to the mass storage device 1216 described above, the computer 1200 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1200.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1216 can store an operating system 1218 utilized to control the operation of the computer 1200. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 1216 can store other system or application programs and data utilized by the computer 1200.

In one configuration, the mass storage device 1216 or other computer-readable storage media is encoded with computer-executable instructions which, when loaded into the computer 1200, transform the computer from a general-purpose computing system into a special-purpose computer capable of implementing the configurations described herein. These computer-executable instructions transform the computer 1200 by specifying how the CPUs 1204 transition between states, as described above. According to one configuration, the computer 1200 has access to computer-readable storage media storing computer-executable instructions which, when executed by the computer 1200, perform the various processes described above. The computer 1200 can also include computer-readable storage media for performing any of the other computer-implemented operations described herein.

The computer 1200 can also include one or more input/output controllers 1224 for receiving and processing input from a number of input devices, such as a keyboard, a mouse, a touchpad, a touch screen, an electronic stylus, or other type of input device. Similarly, an input/output controller 1224 can provide output to a display, such as a computer monitor, a flat-panel display, a digital projector, a printer, or other type of output device. It will be appreciated that the computer 1200 might not include all of the components shown in FIG. 12, can include other components that are not explicitly shown in FIG. 12, or can utilize an architecture completely different than that shown in FIG. 12.

Based on the foregoing, it should be appreciated that technologies for providing a network service capable of identifying infrequently accessed data from a request stream have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A method comprising:
obtaining a first data chunk and a second data chunk of a first plurality of data chunks associated with a first data snapshot of a computing system, the first data snapshot comprising a data set indicative of a reproducible machine state of the computing system at a time, and each data chunk of the first plurality of data chunks having a same predetermined data size;
selecting, from a plurality of hash functions and at random, a first hash function for a first data chunk of the first plurality of data chunks;
selecting, from the plurality of hash functions and at random, a second hash function for a second data chunk of the first plurality of data chunks;
hashing the first data chunk with the first hash function to create a first hash value;
hashing the second data chunk with the second hash function to create a second hash value;
generating a first lookup table having a first hash record that includes the first hash value and a second hash record that includes the second hash value;
creating a first archive comprising the first plurality of data chunks and the first lookup table to a datastore;
obtaining a third data chunk and a fourth data chunk of a second plurality of data chunks associated with a second data snapshot of the computing system;
hashing a third data chunk of the second plurality of data chunks with the first hash function to create a third hash value;
hashing a fourth data chunk of the second plurality of data chunks with the second hash function to create a fourth hash value;
generating a second lookup table having a third hash record that includes the third hash value and a fourth hash record that includes the fourth hash value;
identifying the one or more dissimilar hash values between the first lookup table and the second lookup table, the identifying comprising:
 comparing the first hash record with the third hash record to determine whether the first hash value and the third hash value match;
 comparing the second hash record with the fourth hash record to determine whether the second hash value and the fourth hash value match; and
 identifying the one or more dissimilar data chunks based on the first hash record, the second hash record, the third hash record, and the fourth hash record; and
creating a second archive comprising the one or more dissimilar data chunks, and transmitting the second archive to the datastore.

2. The method as recited in claim 1, further comprising:
identifying a data chunk pair comprising two data chunks having a same hash value;
randomly selecting a complex hash function from a plurality of complex hash functions;
hashing the data chunk pair with the complex hash function to create a complex hash value for the data chunk pair; and
verifying that the data chunk pair is identical based on the complex hash value.

3. The method as recited in claim 1, wherein the first hash record, the second hash record, the third hash record, and the fourth hash record comprise a data partition number indicative of an identification of a data partition in an endpoint, a data endpoint number indicative of an identification of the endpoint, and a data timestamp indicative of a time at which the snapshot was recorded.

4. The method as recited in claim 1, wherein creating the second archive comprises creating an upload package comprising the one or more dissimilar data chunks, the creating comprising:
compressing and encrypting the one or more dissimilar data chunks;
transmitting the upload package to the datastore; and
updating a datastore index comprising a datastore location of the one or more dissimilar data chunks.

5. A method comprising:
obtaining a first data chunk and a second data chunk of a plurality of data chunks associated with a first data snapshot of a computing system;
selecting, from a plurality of hash functions, a first hash function for the first data chunk and a second hash function for the second data chunk;
writing a first hash record to a first lookup table, the first hash record including a first hash value from hashing the first data chunk with the first hash function;
writing a second hash record to the first lookup table, the second hash record including a second hash value from hashing the second data chunk with the second hash function;
creating a first archive comprising the plurality of data chunks and the first lookup table to a datastore;
obtaining a third data chunk and a fourth data chunk of a second plurality of data chunks associated with a second data snapshot of the computing system;
writing a third hash record to a second lookup table, the third hash record including a third hash value from hashing the third data chunk with the first hash function;
writing a fourth hash record to the second lookup table, the fourth hash record including a fourth hash value from hashing the fourth data chunk with the second hash function;
identifying one or more dissimilar data chunks by comparing hash values between the first lookup table and the second lookup table, wherein comparing the hash values comprises verifying an absence of a hash collision with a complex hash function when the hash values are identical; and
creating a second archive comprising the one or more dissimilar data chunks, and transmitting the second archive to the datastore.

6. The method as recited in claim 5, wherein the first data chunk, the second data chunk, the third data chunk, and the fourth data chunk have a same predetermined data size.

7. The method as recited in claim 5, wherein verifying the absence of the hash collision comprises:
identifying a data chunk pair comprising a first data chunk from the first lookup table and a second data chunk from the second lookup table having a same hash value;
randomly selecting the complex hash function from a plurality of complex hash functions;
hashing the first data chunk from the first lookup table and the second data chunk from the second lookup table with the complex hash function to generate a complex hash value; and verifying that the data chunk pair is identical based at least in part on the complex hash value.

8. The method as recited in claim 7, wherein the first hash function and the second hash function are randomly selected from a first group of hash functions.

9. The method as recited in claim 8, wherein the first group of hash functions use fewer bits to store hash values than the plurality of complex hash functions.

10. The method as recited in claim 5, wherein the first hash record, the second hash record, the third hash record, and the fourth hash record comprise a data partition number indicative of an identification of a data partition in an endpoint, a data endpoint number indicative of an identification of the endpoint, and a data timestamp indicative of a time at which the snapshot was saved.

11. The method as recited in claim 5, wherein creating the second archive comprises:
creating an upload package comprising the one or more dissimilar data chunks, the creating comprising:
compressing and encrypting the one or more dissimilar data chunks;
encrypting the first data chunk;
transmitting the upload package to the datastore; and
updating a datastore index comprising a datastore location of the one or more dissimilar data chunks.

12. The method as recited in claim 5, wherein, after verifying that the hash values are identical, writing a pointer on the second lookup table that is indicative of a data location on the datastore.

13. A system comprising:
one or more processors; and
memory to store computer-executable instructions that, when executed, cause the one or more processors to:
obtain a first data chunk and a second data chunk of a plurality of data chunks associated with a first data snapshot of a computing system;
select, from a plurality of hash functions, a first hash function for the first data chunk and a second hash function for the second data chunk;
write a first hash record to a first lookup table, the first hash record comprising a hash value from hashing the first data chunk with the first hash function;
write a second hash record to the first lookup table, the second hash record comprising a second hash value from hashing the second data chunk with the second hash function;
create a first archive comprising the plurality of data chunks and the first lookup table to a datastore;
obtain a third data chunk and a fourth data chunk of a second plurality of data chunks associated with a second data snapshot of the computing system;
write a third hash record to a second lookup table, the third hash record comprising a third hash value from hashing the third data chunk with the first hash function;
write a fourth hash record to the second lookup table, the fourth hash record comprising a fourth hash value from hashing the fourth data chunk with the second hash function;
identify one or more dissimilar data chunks by comparing hash values between the first lookup table and the second lookup table, wherein comparing the hash values comprises verifying an absence of a hash collision with a complex hash function when the hash values are identical; and
create a second archive comprising the one or more dissimilar data chunks, and transmitting the second archive to the datastore.

14. The system as recited in claim 13, wherein the first data chunk, the second data chunk, the third data chunk, and the fourth data chunk have a same predetermined data size.

15. The system as recited in claim 14, wherein verifying the absence of the hash collision comprises:
identifying a data chunk pair comprising a first data chunk from the first lookup table and a second data chunk from the second lookup table having a same hash value;
randomly selecting the complex hash function from a plurality of complex hash functions;
hashing the first data chunk from the first lookup table and the second data chunk from the second lookup table with the complex hash function to generate a complex hash value; and
verifying that the data chunk pair is identical based at least in part on the complex hash value.

16. The system as recited in claim 14, wherein the first hash function and the second hash function are randomly selected from a first group of hash functions.

17. The system as recited in claim 16, wherein the first group of hash functions use fewer bits to store hash values than the complex hash functions of the plurality of complex hash functions.

18. The system as recited in claim 13, wherein creating the second archive comprises:
creating an upload package comprising the one or more dissimilar data chunks, the creating comprising:
compressing and encrypting the one or more dissimilar data chunks;
encrypting the first data chunk;
transmitting the upload package to the datastore; and
updating a datastore index comprising a datastore location of the one or more dissimilar data chunks.

19. The system as recited in claim 13, wherein the computer-executable instructions are further executable by the one or more processsors to, after verifying that the hash values are identical, write a pointer on the second lookup table indicative of a data location on the datastore for the data chunk pair.

20. The system as recited in claim 13, wherein a number of hash functions in the plurality of hash functions is modifiable by a user.

* * * * *